United States Patent
Ohya et al.

(10) Patent No.: US 9,533,277 B2
(45) Date of Patent: Jan. 3, 2017

(54) DEVICE FOR PRODUCING GAS HYDRATE

(75) Inventors: Nobutaka Ohya, Yokohama (JP); Noriya Tokunaga, Yokohama (JP); Tetsuo Hayase, Toyama (JP); Masahiro Takahashi, Ichihara (JP)

(73) Assignee: MITSUI ENGINEERING & SHIPBUILDING CO., LTD., Tokyo (JP)

(*) Notice: Subject to any disclaimer, the term of this patent is extended or adjusted under 35 U.S.C. 154(b) by 747 days.

(21) Appl. No.: 13/824,762

(22) PCT Filed: Oct. 26, 2011

(86) PCT No.: PCT/JP2011/074676
§ 371 (c)(1),
(2), (4) Date: Apr. 15, 2013

(87) PCT Pub. No.: WO2012/057206
PCT Pub. Date: May 3, 2012

(65) Prior Publication Data
US 2013/0195730 A1    Aug. 1, 2013

(30) Foreign Application Priority Data

Oct. 27, 2010    (JP) ................. 2010-240521

(51) Int. Cl.
*B01J 10/00*    (2006.01)
*B01J 19/20*    (2006.01)
(Continued)

(52) U.S. Cl.
CPC ............ *B01J 10/00* (2013.01); *B01J 19/006* (2013.01); *B01J 19/2405* (2013.01);
(Continued)

(58) Field of Classification Search
CPC ............ C08L 3/108; F28G 1/06; F28G 3/08; F28G 7/00
(Continued)

(56) References Cited

U.S. PATENT DOCUMENTS 810,632 A * 1/1906 Faherty .................... F28G 7/00
122/379
4,315,541 A * 2/1982 Murata .................. B01J 19/002
165/109.1

FOREIGN PATENT DOCUMENTS

EP    2196521 A1 * 6/2010 ............... C10L 3/10
JP    2003055676 A    2/2003
(Continued)

OTHER PUBLICATIONS

Machine translation of JP 2003-055676 A (Feb. 2003) to Kato et al.*

*Primary Examiner* — Jennifer A Leung
(74) *Attorney, Agent, or Firm* — Westerman, Hattori, Daniels & Adrian, LLP (57) ABSTRACT

To enable long-term continuous operation by preventing blocking of a reaction pipe line disposed in a multi-pipe or double-walled-pipe heat exchanger, provided is a device for producing gas hydrate including a multi-pipe or double-walled-pipe device 1 for generating gas hydrate having a reaction pipe line 2 for flowing raw material water w and raw material gas g and a coolant circulation region 3 for circulating a coolant c and thereby cooling the reaction pipe line 2, wherein a coil spring 4 extending in the longitudinal direction of the reaction pipe line 2 is provided in the reaction pipe line 2.

16 Claims, 7 Drawing Sheets

(51) Int. Cl.
    C10L 3/10      (2006.01)
    F28G 1/06      (2006.01)
    F28G 3/08      (2006.01)
    F28G 7/00      (2006.01)
    B01J 19/00     (2006.01)
    B01J 19/24     (2006.01)

(52) U.S. Cl.
    CPC ........... B01J 19/2415 (2013.01); C10L 3/108 (2013.01); F28G 1/06 (2013.01); F28G 3/08 (2013.01); F28G 7/00 (2013.01); *B01J 2219/00094* (2013.01); *B01J 2219/00247* (2013.01); *B01J 2219/00772* (2013.01); *B01J 2219/00779* (2013.01)

(58) Field of Classification Search
    USPC ........................................................ 585/15
    See application file for complete search history.

(56) References Cited

FOREIGN PATENT DOCUMENTS

| | | |
|---|---|---|
| JP | 2003252804 A | 9/2003 |
| JP | 2007269950 A | 10/2007 |
| JP | 4062431 B2 | 3/2008 |

\* cited by examiner

DEVICE FOR PRODUCING GAS HYDRATE

CROSS-REFERENCE TO RELATED APPLICATIONS

The present patent application is a nationalization of International application No. PCT/JP2011/074676, filed Oct. 26, 2011, published in Japanese, which is based on, and claims priority from, Japanese Application No. 2010-240521, filed Oct. 27, 2010, both of which are incorporated herein by reference in their entireties.

TECHNICAL FIELD

The present invention relates to a gas hydrate production device for producing gas hydrate of methane, propane, natural gas mainly containing methane, or the like.

BACKGROUND ART

As means for safely and economically transporting and storing a raw material gas such as natural gas or methane, a method using gas hydrate which is solid hydrate of the raw material gas has attracted attention recently. In general, the gas hydrate is generated under high pressure and low temperature (for example, 6.0 MPa and 4° C.). In an existing method for generating the gas hydrate, a raw material gas is supplied in the form of fine bubbles to raw material water, and the gas-liquid contact therebetween is carried out. In particular, a method is disclosed which uses a double-walled-pipe heat exchanger as a device for generating gas hydrate (for example, see Patent Document 1).

Figure 8:
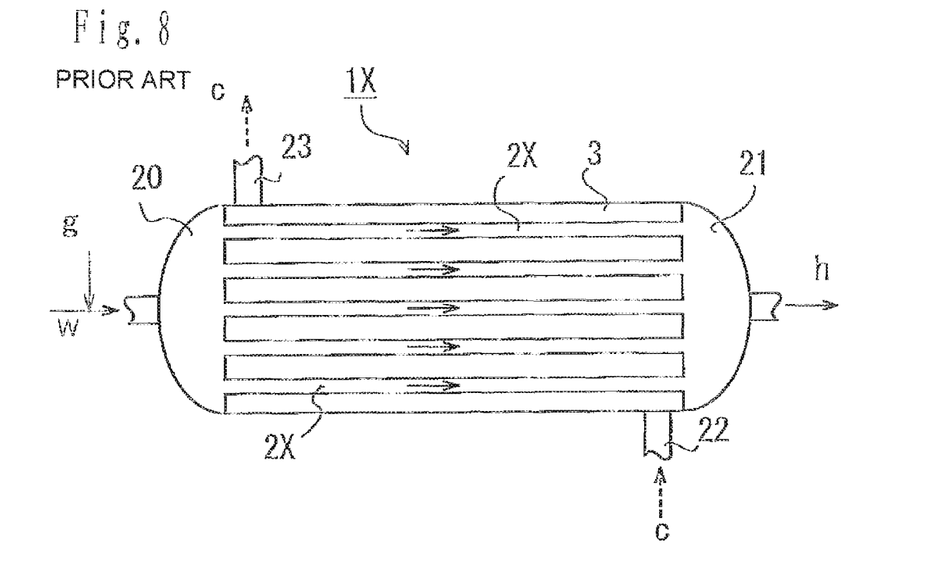
FIG. 8 is a schematic diagram of a conventional device for generating gas hydrate utilizing a multi-pipe heat exchanger.

Here, FIG. 8 shows one example of a device 1X for generating gas hydrate (hereinafter, referred to as a generation device) in a device for producing gas hydrate. The generation device 1X includes a multi-pipe heat exchanger, and has therein a coolant circulation region 3, a branching chamber 20, multiple reaction pipe lines 2X, and a merge chamber 21. Moreover, the generation device 1X has a coolant flow inlet 22 and a coolant flow outlet 23.

Here, when raw material water w and raw material gas g are supplied to the generation device 1X, the raw material water w and so forth are distributed to the multiple reaction pipe lines 2X by the branching chamber 20. In this reaction pipe lines 2X, the raw material water w and the raw material gas g react with each other by gas-liquid contact to form a gas hydrate slurry h. In other words, the reaction pipe lines 2X are used as reactors. The flows of the gas hydrate slurry h generated in the reaction pipe lines 2X, respectively, merge with each other in the merge chamber 21, and the gas hydrate slurry h is discharged to the outside of the generation device 1X.

In parallel with the above, a coolant c is supplied from the coolant flow inlet 22 of the generation device 1X. This coolant c circulates in the coolant circulation region 3, cools the multiple reaction pipe lines 2X, and is discharged from the coolant flow outlet 23. In other words, the coolant c removes heat of formation of the gas hydrate.

The above-described generation device 1X has a structure in which the reaction pipe lines 2X through which the raw material water w and the raw material gas g flow are cooled, so that the heat of formation of the gas hydrate h is removed, and the generation rate of the gas hydrate h is improved. Note that when the temperature in the reaction pipe lines 2X is raised by the heat of formation of the gas hydrate h, the generation efficiency of the gas hydrate h decreases.

Figure 9:
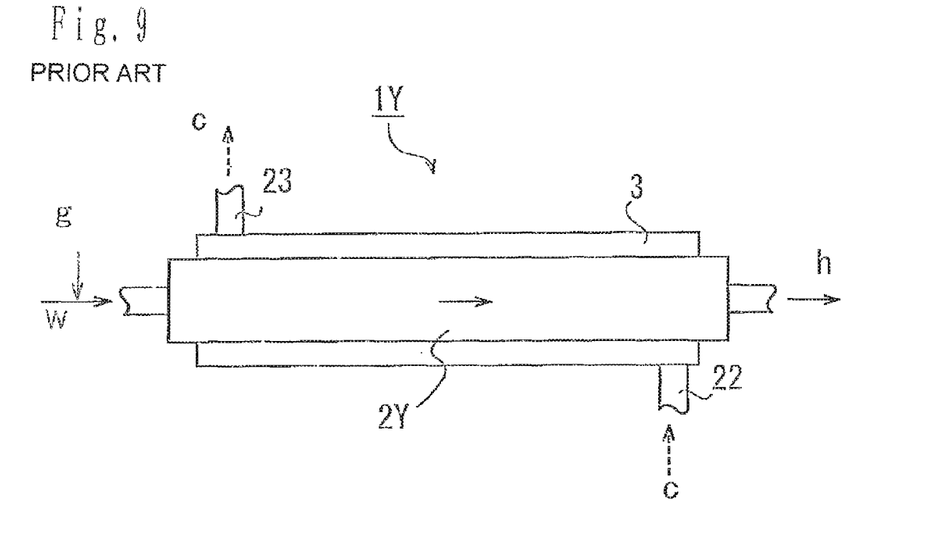
FIG. 9 is a schematic diagram of a conventional device for generating gas hydrate utilizing a double-walled-pipe heat exchanger.

Next, FIG. 9 shows a generation device 1Y constituted of a double-walled-pipe (single pipe) heat exchanger. This generation device 1Y has a single reaction pipe line 2Y, a coolant circulation region 3, a coolant flow inlet 22, and a coolant flow outlet 23. The generation device 1Y also generates gas hydrate as in the case described above.

However, any of the gas hydrate generation methods has several problems. A first problem is that it is difficult to operate the device for producing gas hydrate continuously for a long term, because the gas hydrate is adhered to and grows on the inner walls of the reaction pipe lines to block the reaction pipe lines. Causes of the blocking are as follows: (a) the gas hydrate tends to accumulate at stagnation where the flow is weak; (b) the gas hydrate is generated on or adhered to cooling surfaces of the reaction pipe lines; and the like.

A second problem is that it is difficult to increase the production amount of the gas hydrate. In a device for producing gas hydrate with a large production scale of the gas hydrate, it is necessary to produce a large amount of the gas hydrate in a short term by increasing the generation efficiency of the gas hydrate. In order to improve the generation efficiency of the gas hydrate, it is important to improve the efficiency of the removal of the heat of formation. For this improvement, it is desirable to employ a countermeasure which enables prevention of decrease in the heat transfer coefficient of the heat exchanger for removing the reaction heat.

Moreover, factors which inhibit increase in the amount of the gas hydrate generated are as follows: (a) the gas hydrate generated at gas-liquid interfaces covers bubbles and acts as a diffusion resistance; (b) the bubbles of the gas merge with each other in the reaction pipe lines, so that the area of the gas-liquid surface is reduced; (c) a conventional micro bubble generation apparatus cannot generate micro bubbles, but generates bubbles with large diameters, when the amount of the raw material gas is large, and the gas-liquid ratio is high; and the like. In order to improve the generation efficiency of gas hydrate, it is desirable to employ a countermeasure which solves these problems, and which increases the contact interfaces of the bubbles.

PRIOR ART DOCUMENT

Patent Document

Patent Document 1: Japanese Patent No. 4062431

SUMMARY OF THE INVENTION

Problem to be Solved by the Invention

The present invention has been made in view of the above-described problems, and an object of the present invention is to provide a device for producing gas hydrate which enables long-term continuous operation by preventing adhesion of gas hydrate onto an inner surface of a reaction pipe line disposed in a multi-pipe or double-walled-pipe heat exchanger and preventing blocking of the reaction pipe line. Another object is to provide a device for producing gas hydrate which makes it possible to increase the production amount of gas hydrate by achieving both improvement in cooling performance of the cooling of raw material water and raw material gas in the reaction pipe lines, and prevention of blocking of the reaction pipe lines. Still another object is to provide a device for producing gas hydrate which makes it possible to increase the production amount of the gas hydrate by increasing the chance of gas-liquid contact between the raw material water and the raw material gas.

Note that a double-walled-pipe heat exchanger is used instead of a multi-pipe heat exchanger, when the heat transfer area of a heat exchanger is small. Hereinafter, the expression "multi-pipe heat exchanger" also includes a double-walled-pipe (single pipe) heat exchanger.

Means for Solving the Problem

A device for producing gas hydrate according to the present invention includes: a multi-pipe or double-walled-pipe device for generating gas hydrate having a reaction pipe line for flowing raw material water and raw material gas and a coolant circulation region for circulating a coolant and thereby cooling the reaction pipe line, characterized in that a coil spring extending in the longitudinal direction of the reaction pipe line is provided in the reaction pipe line.

Another device for producing gas hydrate according to the present invention includes: a multi-pipe or double-walled-pipe device for generating gas hydrate having a reaction pipe line for flowing raw material water and raw material gas and a coolant circulation region for circulating a coolant and thereby cooling the reaction pipe line, characterized in that a coil spring extending in the longitudinal direction of the reaction pipe line is provided in the reaction pipe line, and the raw material gas is merged with the raw material water on a side upstream of the reaction pipe line.

Another device for producing gas hydrate according to the present invention includes: a multi-pipe or double-walled-pipe device for generating gas hydrate having a reaction pipe line for flowing raw material water and raw material gas and a coolant circulation region for circulating a coolant and thereby cooling the reaction pipe line, characterized in that a coil spring extending in the longitudinal direction of the reaction pipe line is provided in the reaction pipe line, and the raw material gas is merged with the raw material water in the reaction pipe line.

Another device for producing gas hydrate according to the present invention includes: a multi-pipe or double-walled-pipe device for generating gas hydrate having a reaction pipe line for flowing raw material water and raw material gas and a coolant circulation region for circulating a coolant and thereby cooling the reaction pipe line, characterized in that a coil spring extending in the longitudinal direction of the reaction pipe line is provided in the reaction pipe line, the raw material gas is merged with the raw material water in the reaction pipe line, and further a temperature of a merging portion of the reaction pipe line is set to be higher than an equilibrium temperature.

Moreover, the present invention is characterized in that the coil spring provided in the reaction pipe line is deformable in the longitudinal direction of the reaction pipe line in a direction perpendicular to the longitudinal direction upon contact with the raw material water and the raw material gas.

Moreover, the present invention is characterized in that a cross-sectional shape of a spring material of the coil spring provided in the reaction pipe line is any one of a circular shape, an elliptical shape, and a rectangular shape.

Moreover, the present invention is characterized in that a coil outer diameter of the coil spring provided in the reaction pipe line is 50% or more and 100% or less of an inner diameter of the reaction pipe line.

Moreover, the present invention is characterized in that a baffle plate for receiving a flow of the raw material water is provided to the coil spring provided in the reaction pipe line.

Effects of the Invention

As described above, the present invention provides a device for producing gas hydrate, including: a multi-pipe or double-walled-pipe device for generating gas hydrate having a reaction pipe line for flowing raw material water and raw material gas and a coolant circulation region for circulating a coolant and thereby cooling the reaction pipe line, wherein a coil spring extending in the longitudinal direction of the reaction pipe line is provided in the reaction pipe line. Hence, the present invention makes it possible to prevent adhesion of the gas hydrate to the inside of the reaction pipe line in the device for generating gas hydrate and blocking of the reaction pipe line, and enables long-term continuous operation of the device for generating gas hydrate.

This is because the vibration of the coil spring inserted in the reaction pipe line and the turbulence of the flow in the reaction pipe line make it possible to prevent accumulation of the gas hydrate at a stagnation where the flow is weak, and also to prevent generation or adhesion of the gas hydrate on a cooling surface of the reaction pipe line. For this reason, it is possible to prevent decrease in heat transfer coefficient in the reaction pipe line, and to effectively carry out the generation reaction of the gas hydrate.

Moreover, since the coil spring inserted in the reaction pipe line makes the flow in the reaction pipe line turbulent, gas hydrate covering bubbles in the reaction pipe line is destructed, and new gas-liquid interfaces are formed, so that the generation of the gas hydrate can be accelerated. Moreover, since the coil spring inserted in the reaction pipe line makes the flow in the reaction pipe line turbulent, the merger of the bubbles in the reaction pipe line can be prevented or reduced.

Moreover, since the degree of the gas-liquid dispersion is maintained by the coil spring inserted in the reaction pipe line, a high production can be maintained to the downstream of the reaction pipe line. Moreover, since a high gas-liquid ratio can be employed at the inlet of the reaction pipe line, the production amount of the gas hydrate in a once through production can be increased, and the gas hydrate ratio at the outlet of the reaction pipe line can be increased. In other words, there is an expectation that the number of the reaction pipe lines can be reduced and the gas hydrate can be concentrated.

Moreover, in the present invention, the coil spring extending in the longitudinal direction of the reaction pipe line is provided in the reaction pipe line, and the raw material gas is merged with the raw material water on the side upstream of the reaction pipe line. Hence, the device can be simplified owing to the joining of the raw material water supply pipe and the raw material gas supply pipe on the side upstream of the reaction pipe line. Note that the temperature of the gas merging portion is set to be higher than the equilibrium temperature for prevention of the blocking of the gas merging portion.

Moreover, in the present invention, the coil spring extending in the longitudinal direction of the reaction pipe line is provided in the reaction pipe line, and the raw material gas is merged with the raw material water in the reaction pipe line. Hence, the device can be simplified owing to the joining of the reaction pipe line and the raw material gas supply pipe.

Moreover, in the present invention, the coil spring extending in the longitudinal direction of the reaction pipe line is provided in the reaction pipe line, the raw material gas is merged with the raw material water in the reaction pipe line, and further the temperature of the merging portion of the reaction pipe line is set to be higher than the equilibrium temperature. Hence, the blocking of the gas merging portion can be prevented.

Moreover, in the present invention, the coil outer diameter of the coil spring provided in the reaction pipe line is 50% or more and 100% or less of the inner diameter of the reaction pipe line. Hence, formation of a turbulent flow of the fluid in the reaction pipe line is promoted by the coil spring, and a heat transfer effect near the wall surface can be promoted. Note that the coil outer diameter of the coil spring is desirably 95% or more and 100% or less of the inner diameter of the reaction pipe line, from a practical point of view.

EXPLANATION OF REFERENCE NUMERALS 1 device for generating gas hydrate
2 reaction pipe line
3 coolant circulation region
4 coil spring
7 baffle
w raw material water
g raw material gas
h hydrate slurry

MODES FOR CARRYING OUT THE INVENTION

Hereinafter, an example of a device for producing gas hydrate according to the present invention is described with reference to the drawings. A device 100a for producing gas hydrate shown in FIG. 1 includes a device 1 for generating gas hydrate, a gas-solid liquid separator 9, and a dewatering and molding apparatus 10. The device 1 for generating gas hydrate includes a reaction pipe line 2 and a coolant circulation region 3 (for example, a cooling jacket) mounted on an outer peripheral portion of the reaction pipe line 2. A coil spring 4 is inserted in the reaction pipe line 2.

Figure 1:
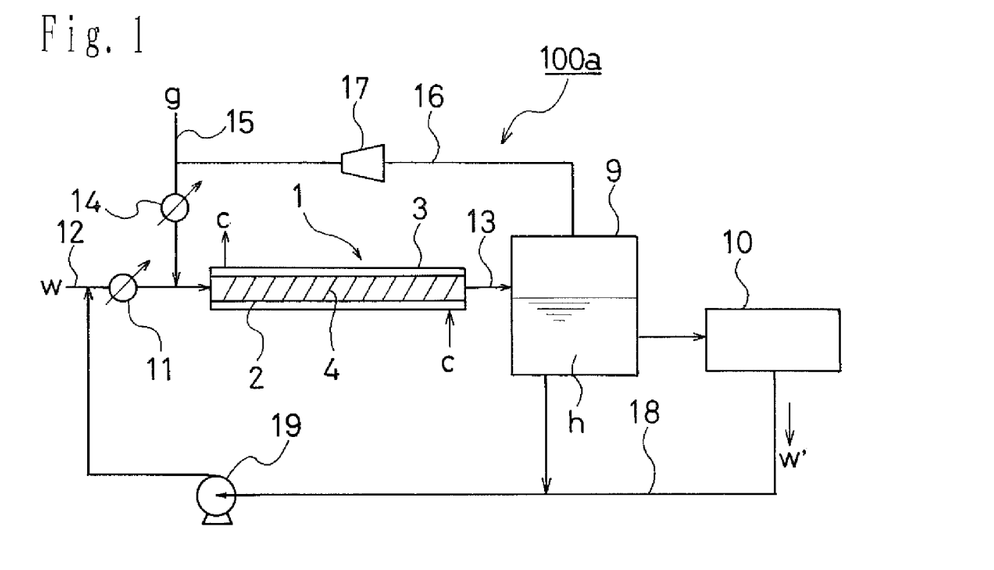
FIG. 1 is a schematic structural diagram showing an example of a device for producing gas hydrate according to the present invention.

Besides, the device 1 for generating gas hydrate is provided with a raw material water supply pipe 12 being located on an upstream side and having a first cooling heat exchanger 11 and with piping 13 being located on a downstream side and communicating with the gas-solid liquid separator 9. The raw material gas supply pipe 15 having a second cooling heat exchanger 14 is located between the first cooling heat exchanger 11 and the device 1 for generating gas hydrate, and is connected to the raw material water supply pipe 12. An unreacted gas return pipe 16 provided at a gas phase portion of the gas-solid liquid separator 9 includes a pressure booster 17, and is connected to the raw material gas supply pipe 15 on a side upstream of the second cooling heat exchanger 14. Piping 18 provided to the dewatering and molding apparatus 10 is connected to the raw material water supply pipe 12 located on a side upstream of the first cooling heat exchanger 11.

Thus, raw material gas g supplied from the raw material gas supply pipe 15 undergoes hydration reaction with raw material water w supplied from the raw material water supply pipe 12 during passage through the device 1 for generating gas hydrate, and is converted into gas hydrate. The gas hydrate is discharged into the gas-solid liquid separator 9 as a gas hydrate slurry h. Unreacted gas separated from the gas hydrate slurry h in the gas-solid liquid separator 9 is increased in pressure with the pressure booster 17, and then is mixed with the raw material gas g. On the other hand, the gas hydrate slurry h remaining in the gas-solid liquid separator 9 is dewatered and molded in the dewatering and molding apparatus 10 to form gas hydrate pellets.

Note that the gas hydrate slurry h is partially returned to the piping 18. A filtrate (water) w' separated from the gas hydrate in the dewatering and molding apparatus 10 passes thorough the piping 18, is increased in pressure with a pump 19, and is returned to the raw material water supply pipe 12. The filtrate (water) w' contains seed crystals of the gas hydrate. Hence, the generation of the gas hydrate can be accelerated by returning the filtrate (water) w' to the raw material water supply pipe 12. In the case of this example, the setting temperature of the first cooling heat exchanger 11 is set to be higher than the equilibrium temperature for prevention of blocking.

Figure 2:
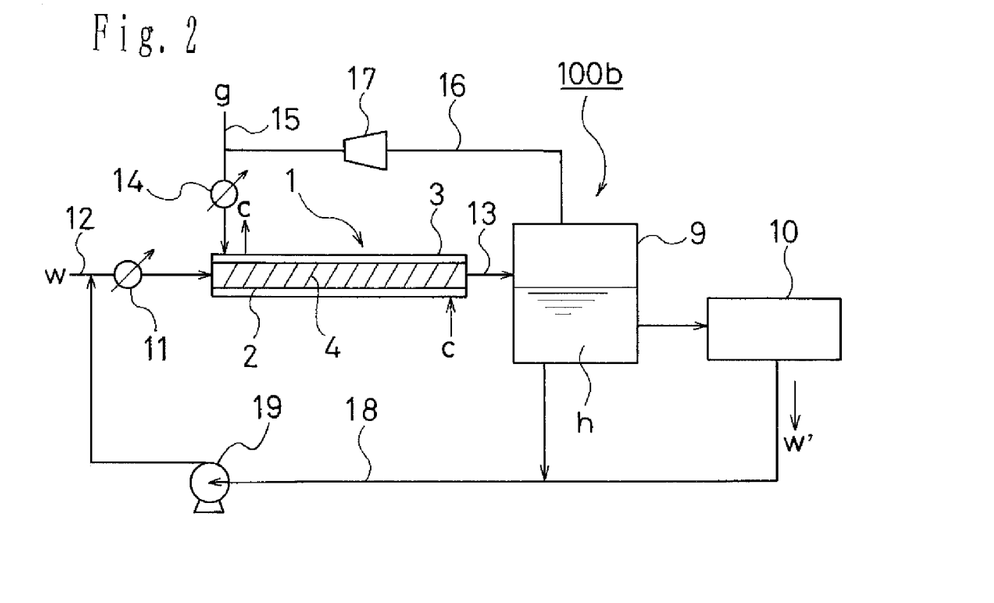
FIG. 2 is a schematic structural diagram showing another example of the device for producing gas hydrate according to the present invention.

FIG. 2 shows another example of the device for producing gas hydrate according to the present invention. In this device 100b for producing gas hydrate, the same devices as those in the above-described device 100a for producing gas hydrate are denoted by the same reference numerals, and detailed descriptions thereof are omitted.

A difference from the above-described device 100a for producing gas hydrate is that the raw material gas supply pipe 15 is connected to the reaction pipe line 2 of the device 1 for generating gas hydrate. In the case of this example, the setting temperatures of the first cooling heat exchanger 11 and the second cooling heat exchanger 14 are set to be higher than the equilibrium temperature for prevention of blocking.

Figure 3:
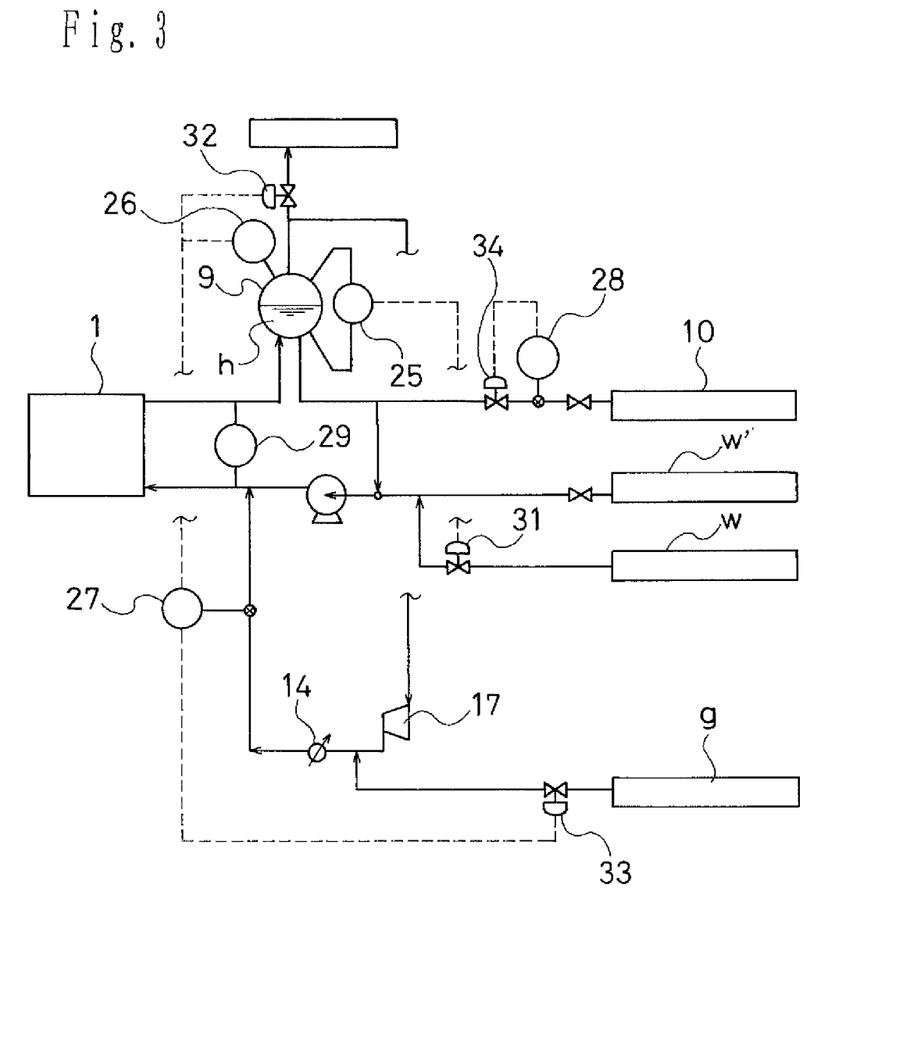
FIG. 3 is a structural diagram of control means of the device for producing gas hydrate according to the present invention.

FIG. 3 is a structural diagram of control means of the device for producing gas hydrate according to the present invention. In the diagram, reference numeral 1 denotes the device for generating gas hydrate, 9 denotes the gas-solid liquid separator, 10 denotes the dewatering and molding apparatus, 25 denotes a level gauge, 26 denotes a pressure gauge, 27 denotes a gas flow meter, 28 denotes a flow meter, and 29 denotes a differential pressure gauge.

The gas hydrate slurry h generated in the device 1 for generating gas hydrate passes through the gas-solid liquid separator 9, and is transferred to a downstream process. The level of the liquid in the gas-solid liquid separator 9 is lowered by the amount of the deposition of the gas hydrate slurry h transferred to the downstream process. For this reason, a valve 31 provided in the raw material water supply pipe 12 is controlled with the level gauge 25 provided to the gas-solid liquid separator 9.

When the pressure of the gas-solid liquid separator 9 is increased excessively, a valve 32 is operated with the pressure gauge 26 to release the gas. When the pressure is low, a valve 33 is operated to supply the raw material gas g. A limitation is imposed on a supply gas flow rate, and the supply gas flow rate is monitored with the flow meter 27.

A pressure difference is created between the gas-solid liquid separator 9 and the downstream process, and flow rate control of the gas hydrate slurry h is conducted with a valve 34, which is controlled with the flow meter 28.

The pressure difference between an inlet and an outlet of the device 1 for generating gas hydrate is monitored with the differential pressure gauge 29. When the pressure difference between the inlet and the outlet of the device 1 for generating gas hydrate exceeds a certain threshold, the temperature (pressure) of a coolant outside the pipe is supposed to be raised.

Figure 4:
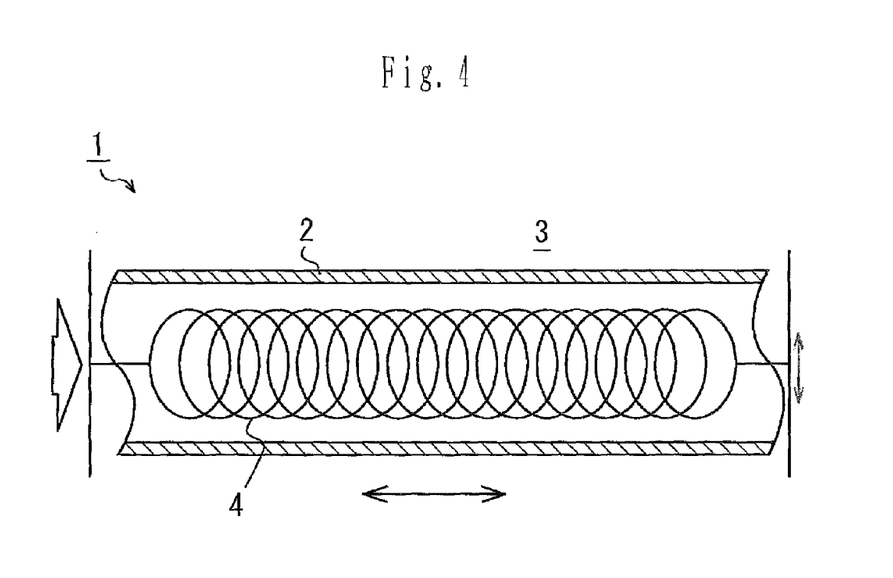
FIG. 4 is a partial schematic diagram of a device for generating gas hydrate which is a main part of the device for producing gas hydrate according to the present invention.

The above-described device 1 for generating gas hydrate is described in further detail. As shown in FIG. 4, the device 1 for generating gas hydrate has the reaction pipe line 2 for generating gas hydrate and the coolant circulation region 3 for circulating a coolant c for cooling. The reaction pipe line 2 has the coil spring 4 extending in the longitudinal direction. Here, the hollow arrow indicates the direction in which the raw material water w and the raw material gas g (hereinafter, referred to as raw material water and so forth) flow. Note that the flow rate of the raw material water w and so forth can be determined on the basis of the performance and the like of the device for producing gas hydrate. The flow rate of the raw material water w is desirably 0.1 to 5.0 m/s, for example.

In addition, the diameter (inner diameter) of the reaction pipe line 2 is set to about 20 to 50 mm, and desirably about 50 mm. This is because an excessively large pipe diameter of the reaction pipe line 2 results in a lowered cooling efficiency, while an excessively small pipe diameter of the reaction pipe line 2 results in an increase in the possibility of blocking. Moreover, the coil outer diameter of the coil spring 4 is set within about the range where the outer periphery of the coil spring 4 can be in contact with an inner wall of the reaction pipe line 2. For example, the coil outer diameter is set to 50 to 100%, and desirably 95 to 100% of the inner diameter of the reaction pipe line.

This is because if the coil outer diameter is small, the coil spring 4 cannot sufficiently be in contact with the inner wall of the reaction pipe line 2. It is also because if the coil outer diameter is large, the motion of the coil spring 4 in the reaction pipe line 2 is reduced, and hence it becomes difficult to remove gas hydrate adhered to the inner wall of the reaction pipe line 2. Note that both ends of the coil spring 4 are fixed to the reaction pipe line 2.

With the above-described structure, the coil spring 4 is expandable and contractible in the longitudinal direction (the left-right direction of FIG. 4) of the reaction pipe line 2, and is swingable in a direction (the up-down direction or the direction penetrating the paper surface of FIG. 1) perpendicular to the longitudinal direction of the reaction pipe line 2.

Figure 5A:
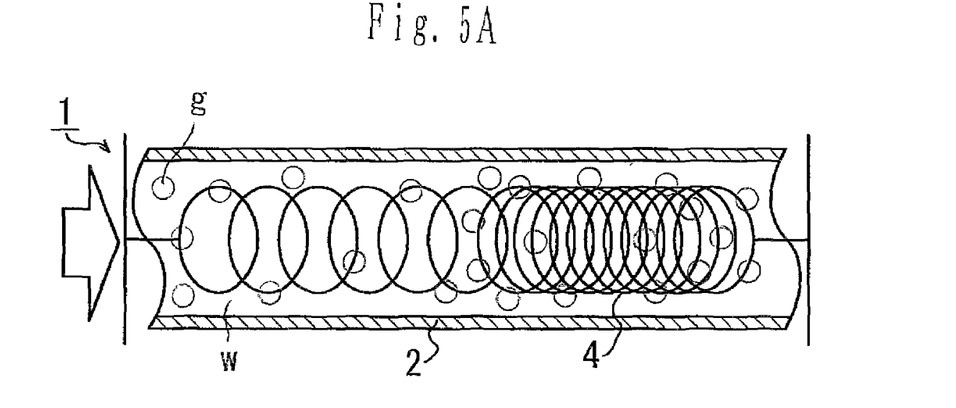
FIG. 5A is an operation explanation diagram showing that a coil spring is deformable in the longitudinal direction of a reaction pipe line.
Figure 5B:
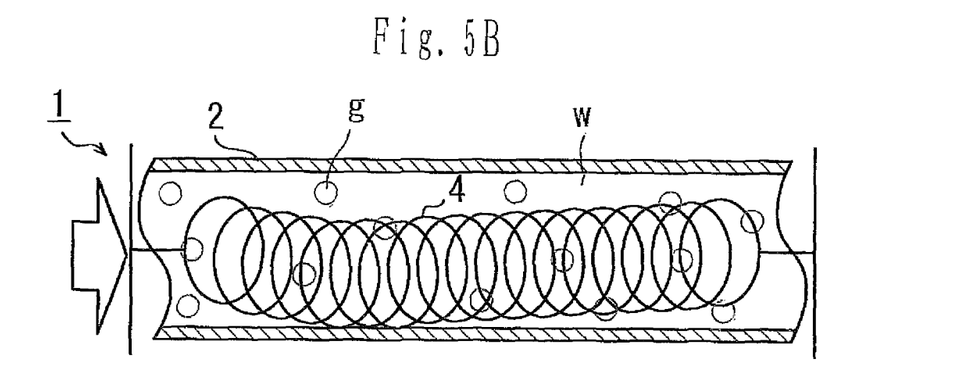
FIG. 5B is an operation explanation diagram showing that the coil spring is deformable in a direction perpendicular to the longitudinal direction of the reaction pipe line.

Next, an operation of the coil spring 4 is described. FIGS. 5A and 5B show a state of expansion and contraction of the coil spring 4 and a state of swing of the coil spring 4, respectively. FIG. 5A shows a state where the coil spring 4 is deformed by the force of the flow of the raw material water w and so forth, so that the coil spring 4 can get denser in the downstream direction (on the right in FIG. 5A). Once the coil spring 4 deforms by a certain amount, the coil spring 4 is deformed by the spring restoring force so that the coil spring 4 can be denser on the upstream side (on the left in FIG. 5A). FIG. 5B shows a state where the coil spring 4 is brought into contact with a surface of the inner wall of the reaction pipe line 2 on a lower side (a lower side of FIG. 5B) by the force of the flow of the raw material water w and so forth. The coil spring 4 is swung by the spring restoring force in the up-down direction (the up-down direction in FIG. 5B).

Note that the expansion and contraction as well as the swing of the coil spring 4 are expressed in combination as a deformation of the coil spring 4. Moreover, a coil spring having a spring constant within a range where the coil spring is expandable and contractible in the reaction pipe line 2 by the force of the flow of the raw material water w and so forth and by the spring restoring force is selected as the coil spring 4. Further, a coil spring which is swingable in the reaction pipe line 2 by the own weight of the coil spring 4, tension, and spring restoring force is selected as the coil spring 4. In other words, the coil spring 4 is configured to be expandable and contractible as well as swingable, so that the coil spring 4 can be brought into contact with the inner wall of the reaction pipe line 2 by the force of the flow of the raw material water w and so forth.

In addition to the above, Kármán vortex is generated around the coil spring 4, when the fluid of the raw material water w and so forth passes through the coil spring 4. Consequently, an effect (hybrid cleaning effect) of cleaning the surface of the inner wall of the reaction pipe line 2 is brought about. Moreover, a turbulent flow promotion effect of the coil spring 4 enables uniform mixing of the raw material gas g and the raw material water w, even when the fluid flows horizontally. Moreover, bubbles of the raw material gas g can be prevented from merging.

The above-described structure brings about the following operation and effect. First, it is possible to prevent adhesion and blocking by gas hydrate in the reaction pipe line 2. This is because of an effect of scraping the gas hydrate owing to the vibration of the coil spring 4 itself and the like, and because of promotion of a turbulent flow of the fluid by the coil spring 4.

Second, there is an effect of maintaining the gas-liquid dispersion to the downstream of the reaction pipe line 2. When the raw material gas is dispersed only in the upstream of the reaction pipe line 2, the bubbles gradually merge with each other in the reaction pipe line 2, so that the diameters of the bubbles are increased, and the generation rate is lowered. In contrast, by maintaining the degree of the gas-liquid dispersion by the inserted coil spring 4, a high generation rate can be maintained to the downstream of the reaction pipe line 2.

Third, even when the ratio of the raw material gas (gas-liquid ratio) is high at the inlet of the reaction pipe line 2, the degree of the gas-liquid dispersion achieved by the inserted coil spring 4 is high. With a high gas-liquid ratio, a current micro bubble generation apparatus cannot generate micro bubbles, but generates bubbles with larger diameters. In contrast, since a high gas-liquid ratio can be employed at the inlet of the reaction pipe line 2, it is possible to increase the production amount of the gas hydrate in a once through production, and to increase the gas hydrate ratio at the outlet of the reaction pipe line 2. In other words, it is possible to reduce the number of the reaction pipe lines, and concentrate the gas hydrate.

Fourth, it is possible to promote heat transfer by the coil spring 4. This is because the formation of a turbulent flow of the fluid in the reaction pipe line 2 is promoted by the coil spring 4, and heat transfer near the wall surface is promoted. This enables efficient removal of heat of formation of the gas hydrate.

Note that the coil spring 4 is provided over the entire length or part of the reaction pipe line 2. This structure enables prevention of the blocking by the gas hydrate in the region where the spring is provided in the reaction pipe line 2. Moreover, it is possible to increase the chance of the gas-liquid contact between the raw material water and the raw material gas.

Moreover, the coil spring 4 may have such a structure that the coil spring 4 is fixed to the reaction pipe line 2 only on the upstream side (the left in FIG. 1). The structure in which the coil spring 4 is not fixed on the downstream side enables improvement of the degree of freedom of expansion and contraction of the coil spring 4 and the degree of freedom of swing of the coil spring 4. In other words, the efficiency of the removal of the gas hydrate adhered to the inner wall of the reaction pipe line 2 is improved, and the chance of the contact between the raw material water w and the raw material gas g can be increased.

Figure 6A:
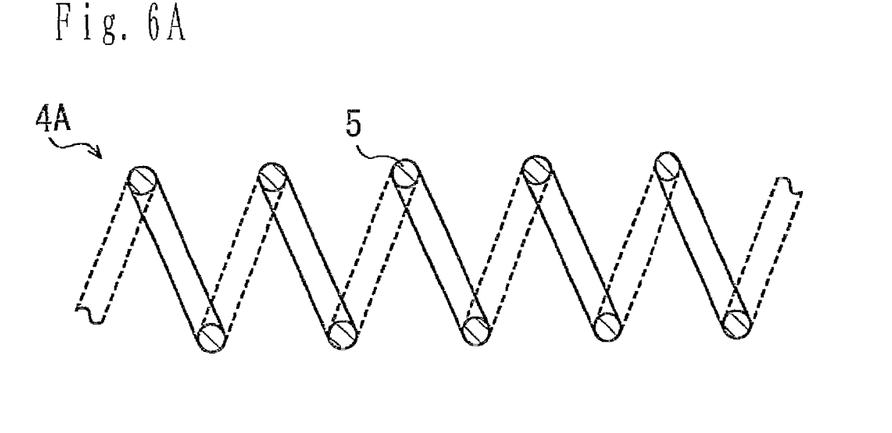
FIG. 6A is a cross-sectional view of a coil spring applied to the device for generating gas hydrate.
Figure 6B:
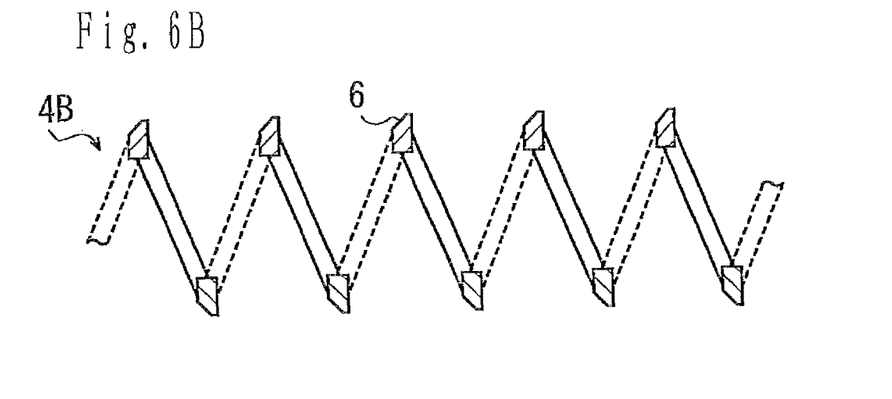
FIG. 6B is a cross-sectional view of another coil spring applied to the device for generating gas hydrate.

FIGS. 6A and 6B show cross-sectional views of the coil springs 4. FIG. 6A shows a coil spring 4A whose spring material has a circular cross-sectional shape. This coil spring 4A makes it possible to achieve the device for producing gas hydrate of the present invention at low costs.

FIG. 6B shows a coil spring 4B whose spring material has a rectangular cross-sectional shape. Specifically, a trapezoidal shape can be employed in which an outer periphery of the spring material on the downstream side (the left in FIG. 6B) is cut. When this coil spring 4B receives the force of the flow of the raw material water and so forth, a force is generated in the vertical direction (the up-down direction in FIG. 6B) of the coil spring 4B itself. In other words, since the coil spring 4B can be actively swung, the efficiency of the removal of the gas hydrate adhered to the inner wall of the reaction pipe line 2 can be improved.

Moreover, it is highly likely that the outer periphery of the coil spring 4B to be brought into contact with the inner wall of the reaction pipe line 2 is an angular portion. Hence, the efficiency of the removal of the gas hydrate can be improved. Moreover, the active swing of the coil spring 4B can make the flow of the raw material water and so forth turbulent, and can improve the chance of the gas-liquid contact. Note that the cross-sectional shape of the spring material may be a triangular shape, a quadrangular shape, a pentagonal or more polygonal shape, or the like, in addition to a circular shape and a trapezoidal shape.

Figure 7A:
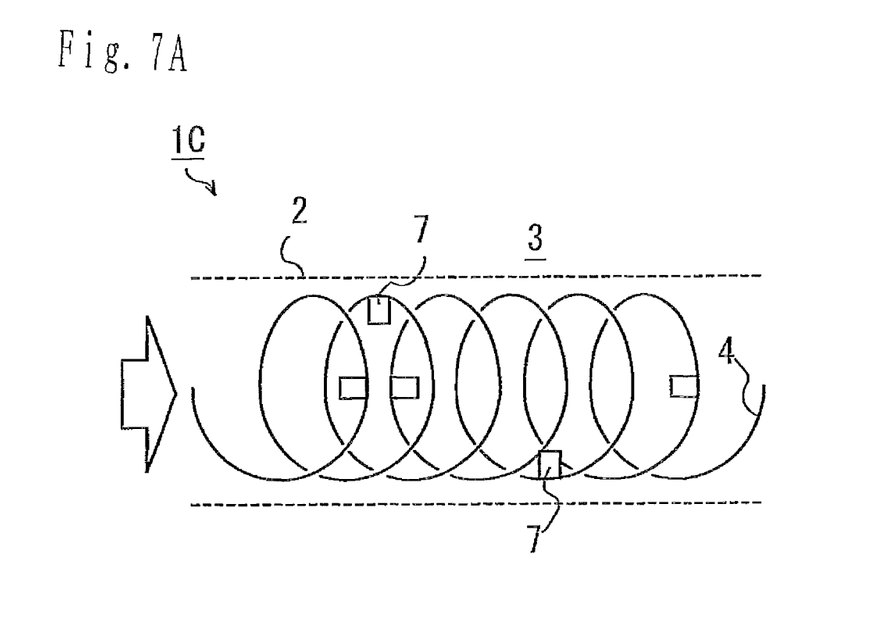
FIG. 7A is a schematic diagram showing an embodiment of a still another coil spring applied to the device for generating gas hydrate.
Figure 7B:
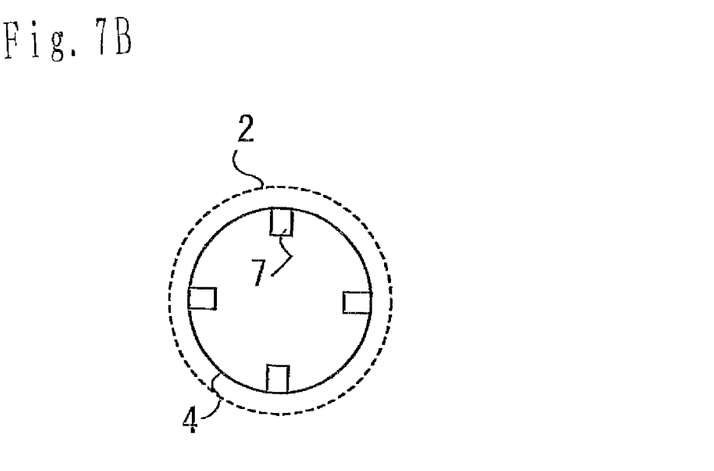
FIG. 7B is a front view of the coil spring of FIG. 7A.

FIG. 7A shows a device 1C for generating gas hydrate of another example. Note that FIG. 7A shows a side view of the coil spring 4, and FIG. 7B shows a front view of the coil spring 4. This coil spring 4 has baffle plates 7. The baffle plates 7 are provided toward the center of the circular coil spring 4 from the spring material of the coil spring 4. In addition, the baffle plates 7 are provided at positions which are rotated from one another by 450° on the circular coil spring.

When receiving the force of the flow of the raw material water and so forth, the baffle plates 7 can actively cause the coil spring 4 to expand and contract, as well as to swing. For this reason, the efficiency of the removal of the gas hydrate adhered to the inner wall of the reaction pipe line 2 can be further improved. In addition, since the amount of the deformation of the coil spring 4 is increased, the chance of the gas-liquid contact between the raw material water w and the raw material gas g can be increased. Note that the positions of the baffle plates 7 provided are not limited to the above-described positions, and can be determined at any positions. Moreover, the baffle plates 7 only need to have a structure which receives the force of the flow of the raw material water and so forth. Hence, the shape of each baffle plate 7 is not limited to a rectangular shape, but may be a circular arc shape, a circular shape, a polygonal shape, or the like.

A structure may be employed in which the device 1 for generating gas hydrate may be placed upright, so that the raw material water w and the raw material gas g flow in the up-down direction. In this case, the raw material water w and the raw material gas g are desirably supplied from a lower portion of the device 1 for generating gas hydrate. This is because the collection efficiency of the gas hydrate can be improved when gas hydrate floating on the raw material water is collected at an upper portion of the generation device 1.

The invention claimed is:

1. A device for producing gas hydrate, comprising:
a multi-pipe or double-walled-pipe device for generating gas hydrate, the multi-pipe or double-walled-pipe device having a reaction pipe line for flowing raw material water and raw material gas, and a coolant circulation region for circulating a coolant and thereby cooling the reaction pipe line, the reaction pipe line having an inner wall,
a coil spring arranged inside the reaction pipe line along the longitudinal direction of the reaction pipe line, the coil spring being deformable in the longitudinal direction of the reaction pipe line and in a direction perpendicular to the longitudinal direction, and the coil spring having an outer diameter dimensioned relative to the inner wall of the reaction pipe line such that the coil spring can be brought into contact with the inner wall of the reaction pipe when the coil spring is deformed,
a plurality of baffle plates arranged in spaced apart relation along the length of the coil spring, each of the baffle plates having a first end on the coil spring and a second end extending in cantilever fashion toward the center of the reaction pipe,
wherein the baffle plates are configured to receive the flow of the raw material water in the reaction pipe line and cause the coil spring to deform and be brought into contact with the inner wall of the reaction pipe line.

2. A device for producing gas hydrate, comprising:
a multi-pipe or double-walled-pipe device for generating gas hydrate, the multi-pipe or double-walled-pipe device having a reaction pipe line for flowing raw material water and raw material gas, and a coolant circulation region for circulating a coolant and thereby cooling the reaction pipe line, the reaction pipe line having an inner wall,
a coil spring arranged inside the reaction pipe along the longitudinal direction of the reaction pipe line, the coil spring being deformable in the longitudinal direction of the reaction pipe line and in a direction perpendicular to the longitudinal direction, and the coil spring having an outer diameter dimensioned relative to the inner wall of the reaction pipe line such that the coil spring can be brought into contact with the inner wall of the reaction pipe when the coil spring is deformed, a plurality of baffle plates arranged in spaced apart relation along the length of the coil spring, each of the baffle plates having a first end on the coil spring and a second end extending in cantilever fashion toward the center of the reaction pipe, wherein the baffle plates receive the flow of the raw material water, by which the coil spring is configured to deform in the longitudinal direction of the reaction pipe line and in a direction perpendicular to the longitudinal direction, and a merging portion on a side upstream of the reaction pipe line where the raw material gas is merged with the raw material water.

3. A device for producing gas hydrate, comprising:

a multi-pipe or double-walled-pipe device for generating gas hydrate, the multi-pipe or double-walled-pipe device having a reaction pipe line for flowing raw material water and raw material gas and a coolant circulation region for circulating a coolant and thereby cooling the reaction pipe line, the reaction pipe line having a merging portion therein where the raw material water and the raw material gas are merged and an inner wall, a coil spring arranged inside the reaction pipe line along the longitudinal direction of the reaction pipe line, the coil spring being deformable in the longitudinal direction of the reaction pipe line and in a direction perpendicular to the longitudinal direction, and the coil spring having an outer diameter dimensioned relative to the inner wall of the reaction pipe line such that the coil spring can be brought into contact with the inner wall of the reaction pipe when the coil spring is deformed, and a plurality of baffle plates arranged in spaced apart relation along the length of the coil spring, each of the baffle plates having a first end on the coil spring and a second end extending in cantilever fashion toward the center of the reaction pipe, wherein the baffle plates receive the flow of the raw material water, by which the coil spring is configured to deform in the longitudinal direction of the reaction pipe line and in a direction perpendicular to the longitudinal direction.

4. A device for producing gas hydrate, comprising:

a multi-pipe or double-walled-pipe device for generating gas hydrate, the multi-pipe or double-walled-pipe device having a reaction pipe line for flowing raw material water and raw material gas and merging the raw material water and the raw material gas therein, and a coolant circulation region for circulating a coolant and thereby cooling the reaction pipe line, the reaction pipe line having an inner wall, a coil spring arranged inside the reaction pipe line along the longitudinal direction of the reaction pipe line, the coil spring being deformable in the longitudinal direction of the reaction pipe line and in a direction perpendicular to the longitudinal direction, and the coil spring having an outer diameter dimensioned relative to the inner wall of the reaction pipe line such that the coil spring can be brought into contact with the inner wall of the reaction pipe when the coil spring is deformed, a plurality of baffle plates arranged in spaced apart relation along the length of the coil spring, each of the baffle plates having a first end on the coil spring and a second end extending in cantilever fashion toward the center of the reaction pipe, wherein the baffle plates receive the flow of the raw material water, by which the coil spring is configured to deform in the longitudinal direction of the reaction pipe line and in a direction perpendicular to the longitudinal direction, and the raw material gas is merged with the raw material water in the reaction pipe line, and further means for setting a temperature of a merging portion of the reaction pipe line higher than an equilibrium temperature.

5. The device for producing gas hydrate according to claim 1, characterized in that the coil spring provided in the reaction pipe line is deformable in the longitudinal direction of the reaction pipe line and in a direction perpendicular to the longitudinal direction upon contact with the raw material water and the raw material gas.

6. The device for producing gas hydrate according to claim 1, characterized in that a cross-sectional shape of a spring material of the coil spring provided in the reaction pipe line is anyone of a circular shape, an elliptical shape, and a rectangular shape.

7. The device for producing gas hydrate according to claim 1, characterized in that a coil outer diameter of the coil spring provided in the reaction pipe line is 50% or more and 100% or less of an inner diameter of the reaction pipe line.

8. The device for producing gas hydrate according to claim 2, characterized in that the coil spring provided in the reaction pipe line is deformable in the longitudinal direction of the reaction pipe line and in a direction perpendicular to the longitudinal direction upon contact with the raw material water and the raw material gas.

9. The device for producing gas hydrate according to claim 3, characterized in that the coil spring provided in the reaction pipe line is deformable in the longitudinal direction of the reaction pipe line and in a direction perpendicular to the longitudinal direction upon contact with the raw material water and the raw material gas.

10. The device for producing gas hydrate according to claim 4, characterized in that the coil spring provided in the reaction pipe line is deformable in the longitudinal direction of the reaction pipe line and in a direction perpendicular to the longitudinal direction upon contact with the raw material water and the raw material gas.

11. The device for producing gas hydrate according to of claim 2, characterized in that a cross-sectional shape of a spring material of the coil spring provided in the reaction pipe line is anyone of a circular shape, an elliptical shape, and a rectangular shape.

12. The device for producing gas hydrate according to of claim 3, characterized in that a cross-sectional shape of a spring material of the coil spring provided in the reaction pipe line is anyone of a circular shape, an elliptical shape, and a rectangular shape.

13. The device for producing gas hydrate according to of claim 4, characterized in that
a cross-sectional shape of a spring material of the coil spring provided in the reaction pipe line is anyone of a circular shape, an elliptical shape, and a rectangular shape.

14. The device for producing gas hydrate according to of claim 2, characterized in that
a coil outer diameter of the coil spring provided in the reaction pipe line is 50% or more and 100% or less of an inner diameter of the reaction pipe line.

15. The device for producing gas hydrate according to of claim 3, characterized in that
a coil outer diameter of the coil spring provided in the reaction pipe line is 50% or more and 100% or less of an inner diameter of the reaction pipe line.

16. The device for producing gas hydrate according to of claim 4, characterized in that
a coil outer diameter of the coil spring provided in the reaction pipe line is 50% or more and 100% or less of an inner diameter of the reaction pipe line.

* * * * *